Patented May 10, 1932

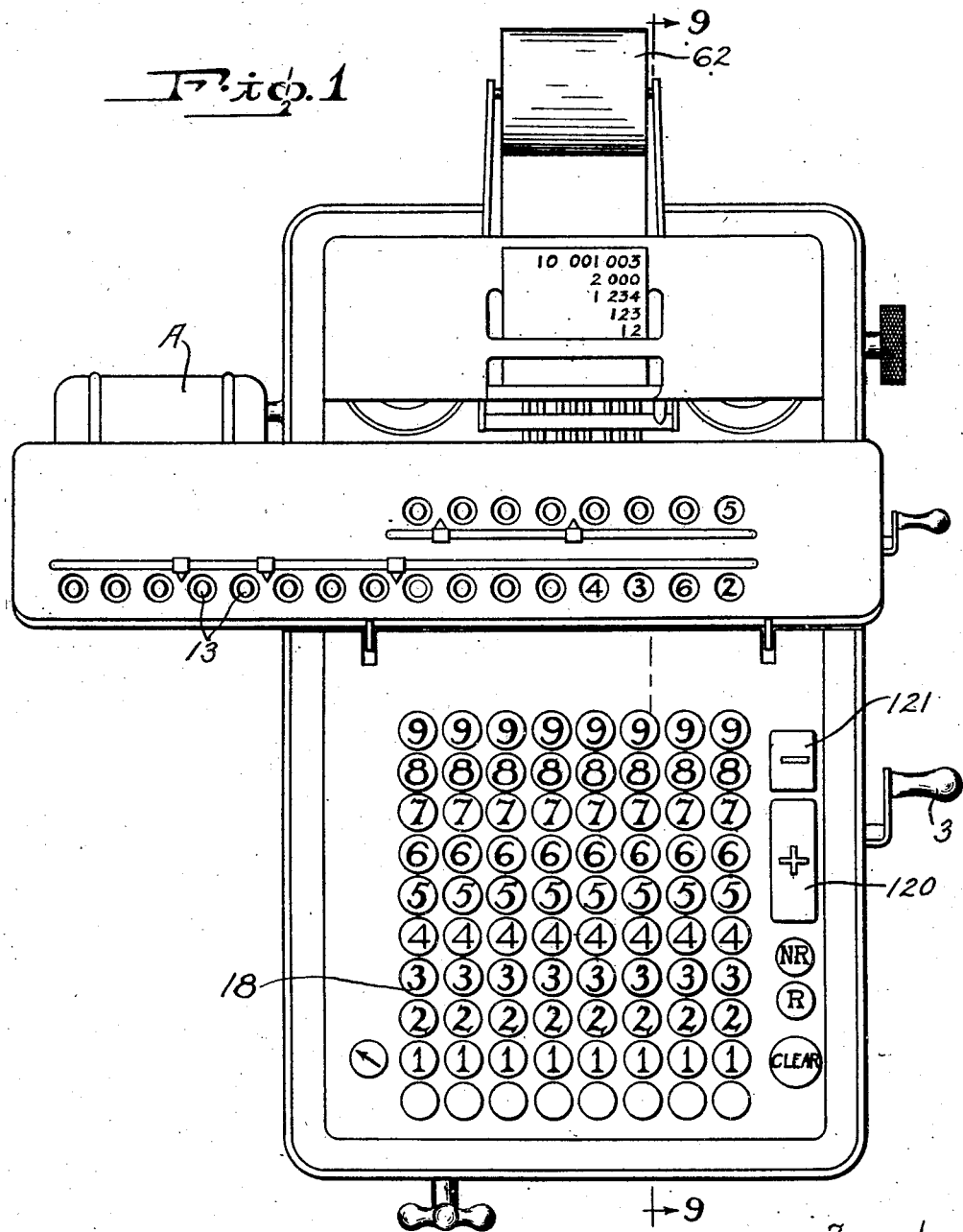

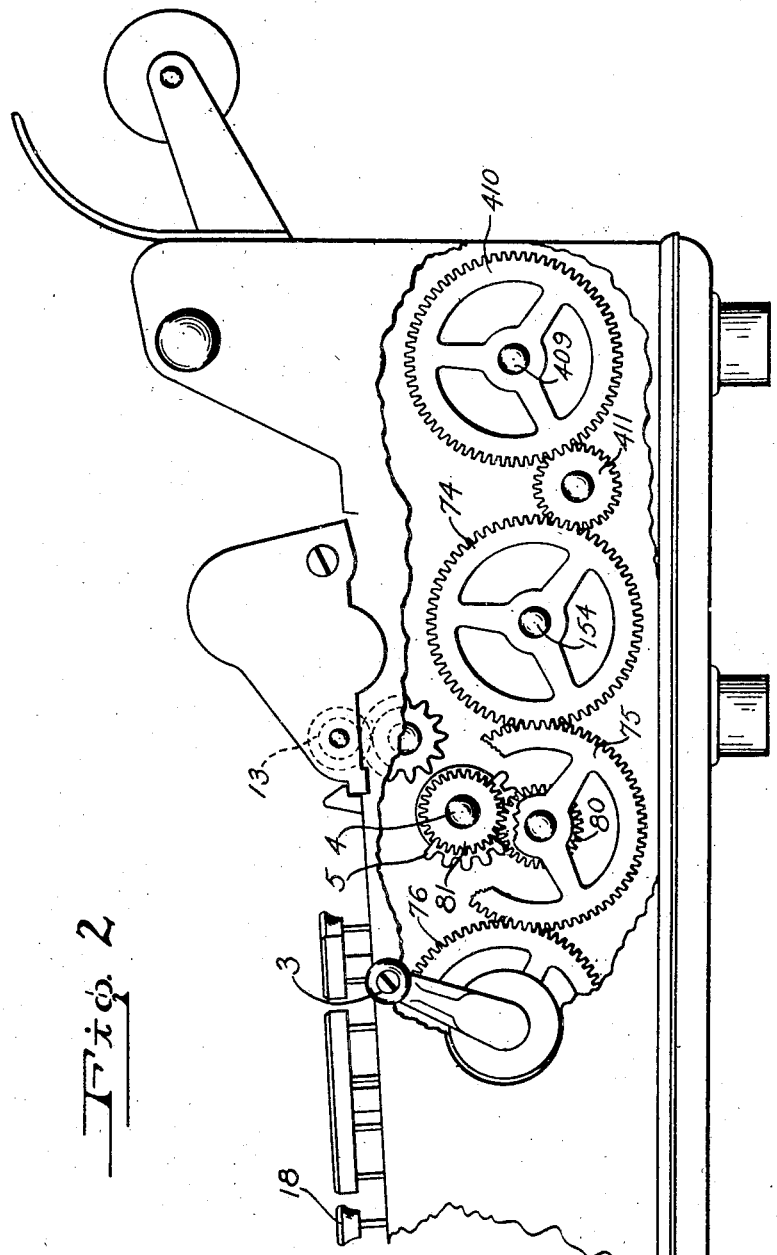

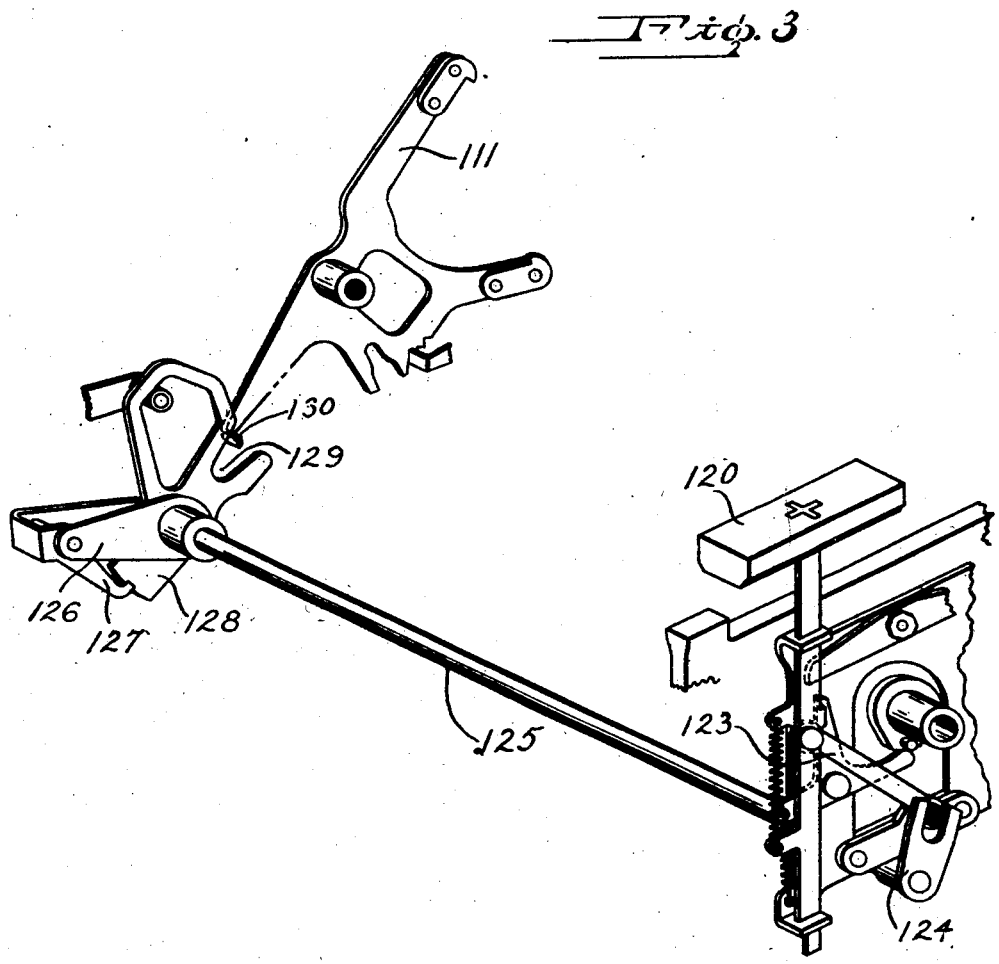

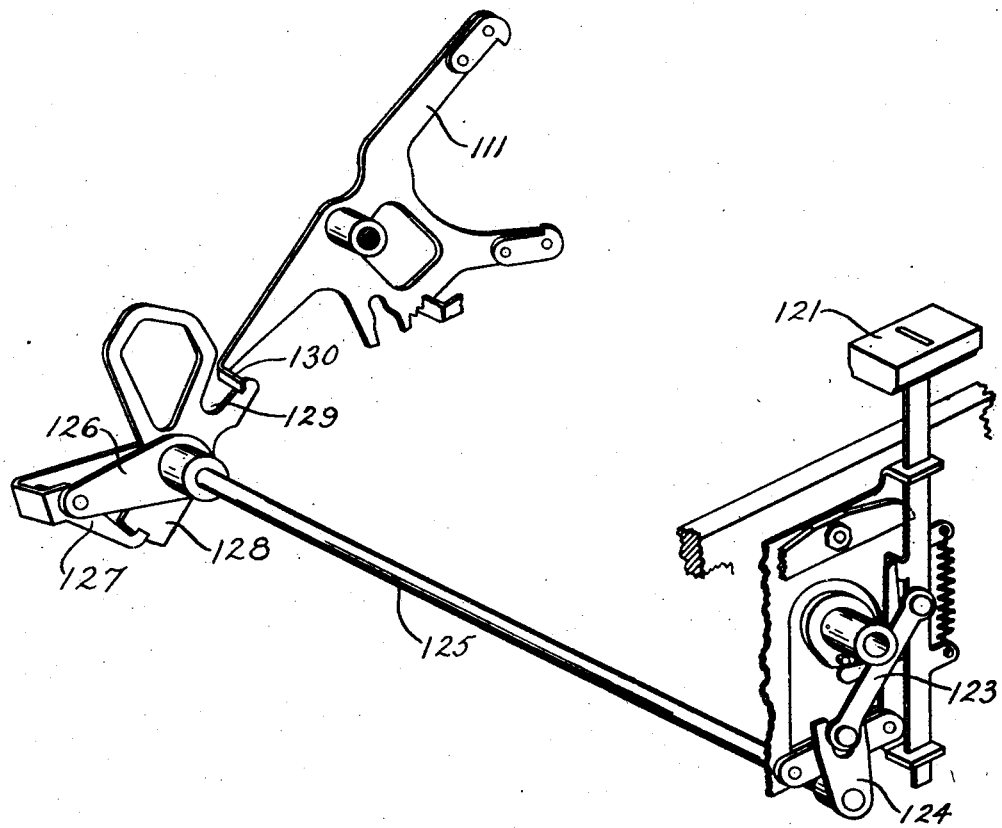

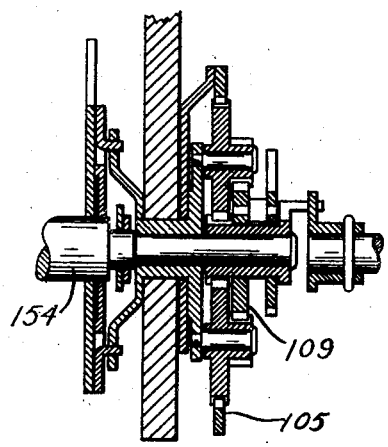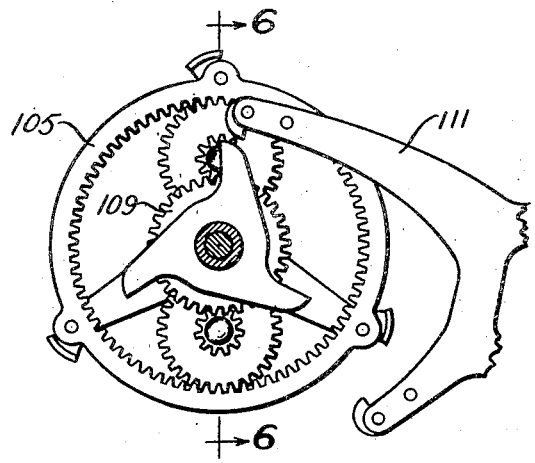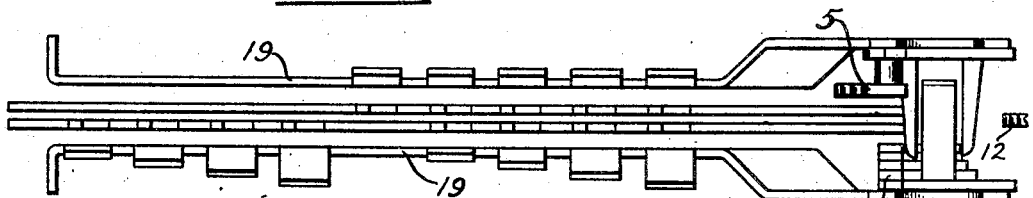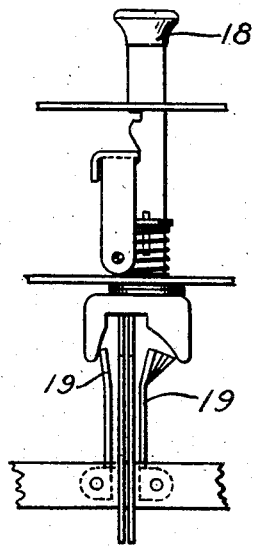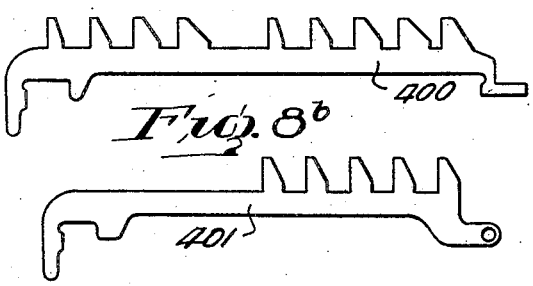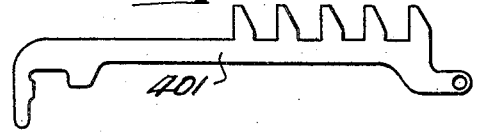

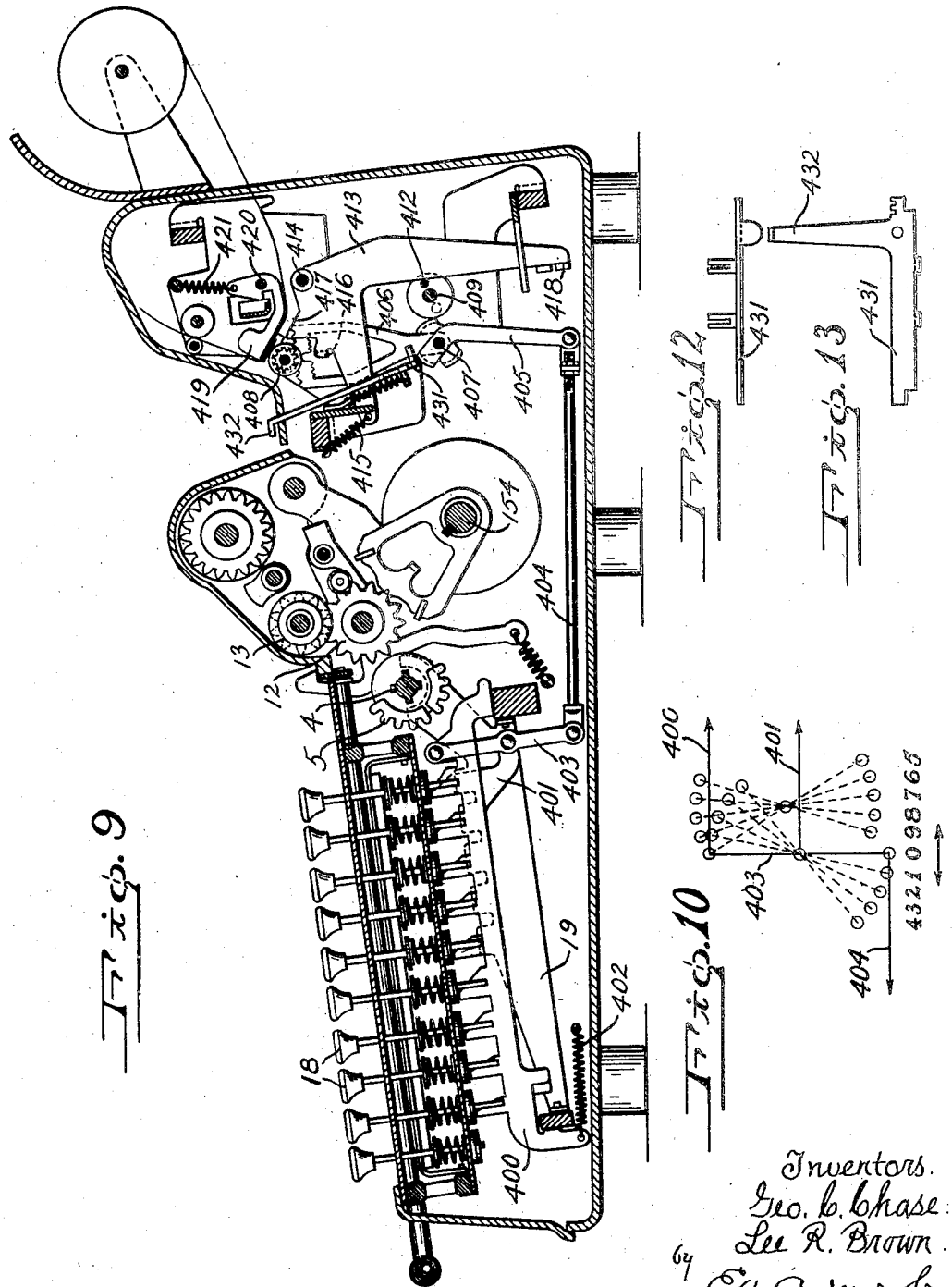

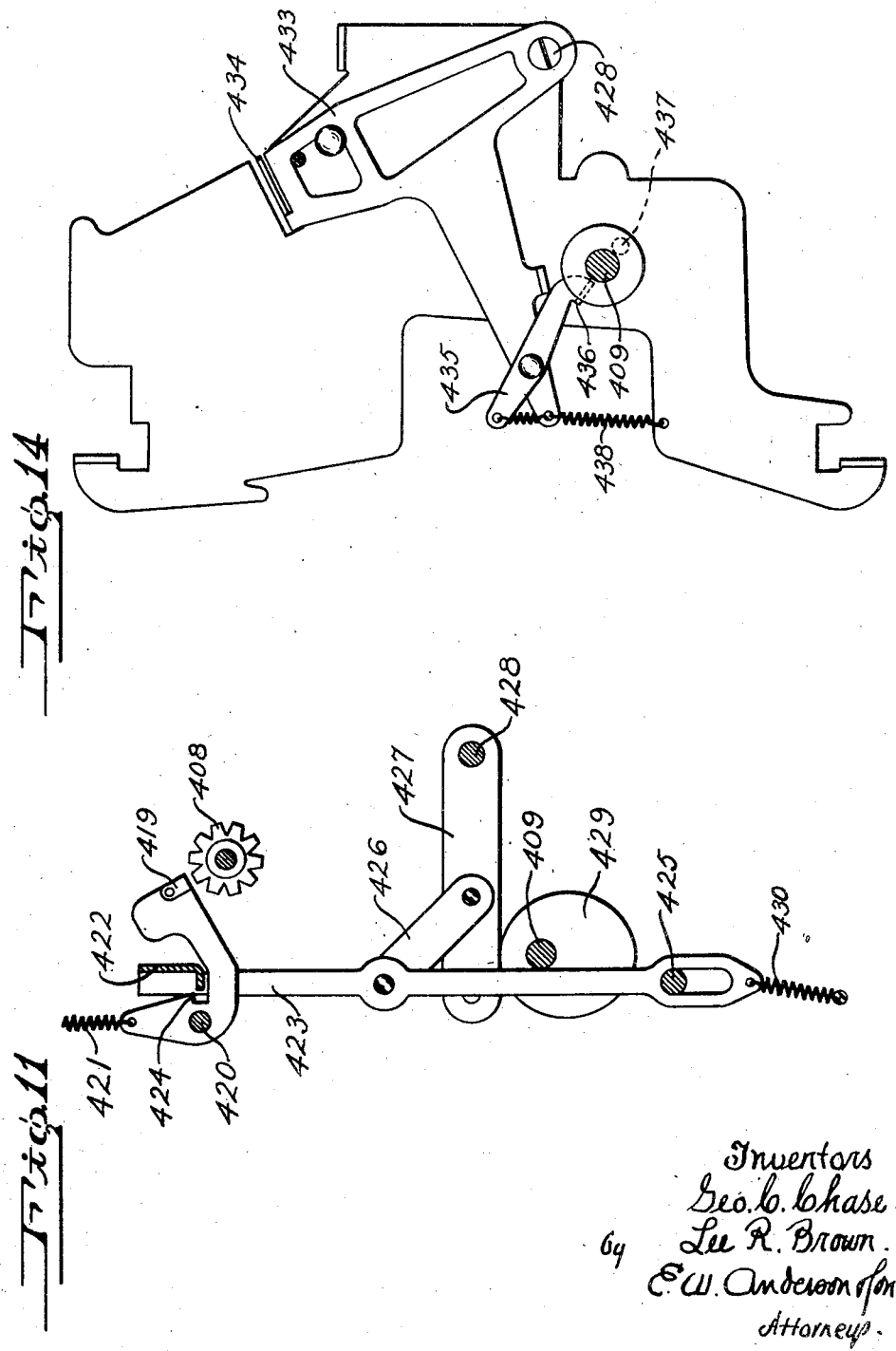

1,857,356

UNITED STATES PATENT OFFICE

GEORGE C. CHASE, OF SOUTH ORANGE, AND LEE R. BROWN, OF EAST ORANGE, NEW JERSEY, ASSIGNORS TO MONROE CALCULATING MACHINE COMPANY, OF ORANGE, NEW JERSEY, A CORPORATION OF DELAWARE

CALCULATING AND LISTING MACHINE

Application filed December 14, 1929, Serial No. 414,142, and in France December 17, 1928.

The invention relates to a calculating and listing machine having for its object the provision of improved printing and selecting mechanism.

The invention consists in the novel construction and combination of parts as set forth in the accompanying drawings.

In the accompanying drawings, illustrating the invention;

Figure 1 is a plan view of a calculating machine embodying the invention;

Fig. 2 is a side elevation of the same.

Fig. 3 is a detail perspective view of the clutch control mechanism, showing the add key depressed.

Fig. 4 is a similar view, showing the subtract key depressed.

Fig. 5 is a detail side elevation of the clutching and reversing transmission mechanism.

Fig. 6 is a section of the same, taken on line 6—6, Fig. 5.

Fig. 7 is a detail front elevation of a digital key and selecting members set thereby.

Fig. 8 is a detail plan view of a pair of selecting rock bars and differential actuating gears.

Figs. 8a and 8b are detail side elevations of the two setting slides of the type wheel mechanism.

Fig. 9 is a section of the machine, taken on the line 9—9, Fig. 1.

Fig. 10 is a diagrammatic view, illustrating the action of the type selector slides and floating lever.

Fig. 11 is a detail side elevation of the type hammer actuating mechanism.

Fig. 12 is a detail plan view of the slide bar for shifting the type wheels.

Fig. 13 is a front elevation of the same.

Fig. 14 is a detail side elevation of the means for shifting the ribbon to print in one or in another contrasting color.

In these drawings the invention is shown as applied to a calculating machine constructed in accordance with the disclosure of United States Patent Number 1,566,650.

In this machine, amounts set up on the keyboard 18 and thereby on the differential actuating gears 5 by means hereinafter more fully described, are registered upon numeral wheels 13 by the operation of the differential gear shaft 4 (Fig. 2) and the shaft 154 whereon the tens-carry members are mounted, these shafts being connected by a train of one-to-one ratio gearing, 74, 75, 80, 81. A hand crank 3, operating the gear 76, meshing with gear 75, of said train, may be used to drive the machine, motor "A" being, however, the recognized means of operation.

The motor driving means illustrated is substantially the same as that disclosed in the patent above referred to, motor "A" having driving connection with a planetary gear mechanism, (Figs. 5 and 6) the gear members 105, 109 of which normally rotate idly, but may be selectively arrested by means of the reversing clutch lever 111, to drive the third member of the differential, connected with carry shaft 154. forwardly or reversely.

Motor operation is controlled by means of an add key 120 and a substract key 121, (Figs. 3 and 4) each having link engagement 123 with an arm 124 of rock shaft 125, said shaft having at its opposite end an arm 126 connected with a setting lever 128 by means of coupling 127. Lever 128 is provided with a recess 129, between the walls of which lies a lug 130 of reversing clutch lever 111. Depression of the add or subtract key will therefore rock lever 111 in the one or the other direction and effect additive or subtractive operation of the machine.

Suitable means are provided, as disclosed in Patent 1,566,650, for disengaging the clutch and bringing the released actuating means to rest in full-cycle position.

Selective setting

The differential actuating gears 5 (Figs. 7, 8, 9) are made in two parts, one part having five teeth of equal extent and the other part having four teeth of graded length, the two parts of the gear being movable toward each other by means of rock bars 19. Varying degrees of movement of one or both of these rock bars will bring different numbers of gear teeth into position to act upon the intermediate gears 12, which are normally located between the parts of the gear 5.

The rock bars 19 related to each pair of gear members 5, extend beneath a bank of keys of the keyboard 18, these keys being provided with lower cam ends, adapted to engage lugs of the rock bars and thereby to move the parts of the gears toward each other to set up the number of teeth corresponding to the value of the key depressed. In order to accomplish this selective setting of the gears, the lugs of the bars 19 are offset from the center line of the key bank to different extents, and therefore are acted upon by greater or lesser portions of the cam surfaces of the keys. The 1, 2, 3 and 4 keys will, therefore, move the right-hand rock bar 19 to bring 1, 2, 3 and 4 of the teeth of the right-hand gear section into line with the intermediate gear 12. The 5 key will move the left-hand rock bar to bring the five teeth of the opposite gear section into line with the intermediate gear 12; and the 6, 7, 8 and 9 keys will move the left-hand rock bar 19 in a similar manner and will move the right-hand rock bar 19 to bring 1, 2, 3 or 4 teeth into line, in addition to the five teeth set up by the left-hand bar.

Between each pair of rock bars 19, are arranged two parallel slides 400 and 401, (Fig. 9) held in rearward position, against a cross member of the machine frame by springs 402. At their rear ends, the slides 400 and 401 are pivoted respectively to the upper and the middle portion of a lever 403, the lower end of which is connected, by rod 404, to the depending arm 405 of a segment 406. There is thus a segment 406 for each column of keys 18, these segments being pivoted at 407 and meshing with the pinions of type wheels 408. The upper edge of the slide 400 is provided with eight cam projections underlying the keys 1 to 4 and 6 to 9 of the related column and adapted, upon the depression of a key, to cam the slide forwardly, one step for the 1 and 6 keys, two steps for the 2 and 7 keys, three steps for the 3 and 8 keys, and four steps for the 4 and 9 keys, as will be apparent from an inspection of the mechanism illustrated in Fig. 9 and as diagrammatically set forth in Fig. 10.

The slide 401 is provided with five upward cam projections, underlying the 5 to 9 keys, and adapted, upon depression of any of these keys, to cam the slide forwardly to a single given extent. Forward movement of slide 400 will move rod 404 rearwardly, since the lever 403 will fulcrum upon the pivotal connection with slide 401, and the segment 406 will rotate the type wheel so that the characters 1, 2, 3, or 4 will displace the character 0 at the printing position, according to the key 1, 2, 3, or 4, which has been depressed. Depression of the 5 key will, through slide 401 and lever 403, move rod 404 forwardly five steps, causing the character 5 to come to printing position since the type characters of wheels 408 are arranged in the order of a row of figures shown in Fig. 4 of the drawings.

Depression of the keys 6 to 9 will give the same movement to slide 401 as that imparted by the 5 key, but, since slide 40 is also moved forwardly, lever 403 will be operated, from its new fulcrum, to move the type wheel, one, two, three, or four steps from 5 forwardly toward 0; that is to say, to 6, 7, 8, or 9, according to the key depressed.

Obviously, the above construction will provide that, if a key is depressed and the type wheel is unable to rotate to the selected position, as, for instance, if the segments are locked, during the operation of the machine, by the aligning devices to be described hereinafter, the slides will be able to adjust themselves to the condition, since, if the rod 404 is held, the slide may nevertheless move forwardly.

It will be further obvious that, with this construction, any amount set up in the gears 5 will also be represented by the setting of the type wheels 408, even though several of the keys may have been simultaneously depressed. Both of the selecting mechanisms are so arranged that by simultaneous depression of two keys, the digits from 6 to 9 may be set up upon the lower half of the keyboard, since depression of the 5 key and of the 1 key will set the selectors to represent "6," and so forth.

The selecting mechanism last described herein has been shown as applied to the setting of printing wheels, but it will be obvious that any non-accumulating device may be set by means of this mechanism, as, for instance, index dials which will represent the amount set in the keyboard.

Aligning the type, etc.

When the registration of the keyboard setting has begun, upon the depression of the add or the subtract key, devices are operated to align and hold the type wheels in adjusted position, these devices being utilized also to prevent the printing of zeros in the places to the left of the highest digit to be printed.

For this purpose, a shaft 409 is connected to gear 74 by gearing 410, 411 (Fig. 2), said shaft carrying an eccentric member 412 (Fig. 9). An alignor 413 pivoted at 414, is provided for each segment 406, these alignors being held out of engagement with the segments, in the full-cycle position of the register actuators, by contact of the eccentric member 412 with depending arms of the alignors. As shaft 409 is rotated, the alignors are permitted to engage the segments 406, under the influence of springs 415, fingers 416 of the alignors entering cam notches of the segments and bringing the type into alignment.

Each of the alignors, except the two at the right-hand side of the group, are provided with upward projections 417, and the central or 0 notches of the corresponding segments are made of greater depth than the digit notches, so that, under certain conditions, when the type wheels stand at 0, the alignors may have a greater movement, and the projections 417 thereof will rise into the path of the printing hammers and prevent the printing of zeros in the corresponding places. The depending arm of each of these left-hand alignors has a lug 418, lying in the path of movement of the adjacent right-hand arm, so that when a digit is set up and the corresponding alignor finger 416 is brought into contact with the walls of the shallow segment notch, the fingers of all of the alignors to the right thereof will be prevented from entering fully into the 0 notches, and the projections 417 thereof will not interfere with the printing of zeros in these places.

*Printing*

The printing hammers 419, pivoted at 420 and having springs 421, are energized and released as follows:

A bar 422, (Fig. 11), carried by arms 423, is provided with a flange adapted to engage beneath teeth 424 of the hammers. The arms 423 have lower guiding engagement with rod 425 and are connected by links 426 with followers 427, pivoted at 428 and reciprocated by cams 429, secured upon shaft 409. The followers are held against the cams by springs 430 attached to the arms 423.

Upon rotation of shaft 409, cam 429 will lift follower 427 and link 426 will first push the flange of bar 422 beneath the teeth 424 of the hammers and, upon continued lifting of the follower, will raise the hammers until the flange cams pass the teeth and release the hammers. The released hammers, under the momentum of the movement imparted by springs 421, will fall past their normal position of rest and will strike the paper against the type of wheels 408. Upon further rotation of the shaft 409, follower 427 will be allowed to fall and the flange of bar 422 will be retracted to initial position.

*Decimalizing*

The type wheels 408 are arranged in groups along their shaft separated by spaces indicating the divisions between certain decimal orders. At times it is desirable that the groups should represent hundredths and tenths; units, tens, and hundreds; thousands, and so forth, while at other times it is desirable that the lowest order should represent units, in which case the lower order group of two should become a group of three wheels, and the higher groups of three should be maintained by a rearrangement of the wheels.

To accomplish this rearrangement, a slide bar 431 (Figs. 9, 12, 13) is mounted in the segment and type wheel supporting frames, and is provided with shipper lugs embracing the hub portions of every third segment 406. The bar 431 is notched at one upper edge, where it passes through the frame and is spring-held so that the notches will locate it in right-hand or in left-hand position. An upwardly projecting thumb piece 432 provides exterior means for adjusting slide bar 431. The teeth of segments 406 engage the type wheel pinions in a recess formed by the type wheels upon one side, and suitable flanges upon the other, so that as the segment is shifted by bar 431, the type wheels will also be shifted.

*Ribbon and paper mechanism*

Any one of the numerous well-known devices may be used for feeding and reversing the printing ribbon, and for feeding the paper record strip, the shaft 409 providing a convenient power connection for such devices.

Preferably, a two-color ribbon is used, and means are provided for printing values which are added to the register wheels 13 in one color, and values which are subtractively registered, in a contrasting color.

For this purpose, guide arms 433 (Fig. 14), pivoted at 428, have engagement with the ribbon at 434 and are provided with rearward extensions carrying spring pawls 435. The pawls 435 have lugs 436, lying in the path of movement of eccentric pins 437 of suitable collars, secured to shaft 409. During additive rotation of shaft 409, the pins 437, engaging lugs 436, will idly displace the spring pawls, but during subtractive rotation the pawls will be forced against stop lugs of the guide arms 433, rocking the same and bringing the contrastingly colored edge of the ribbon opposite the type.

We claim:

1. In a calculating and listing machine having ordinal type-carrying members and printing hammers; members movable to align the type and further selectively movable into the path of said hammers to prevent the printing of zero to the left of any highest order digit to be printed.

2. In a calculating and listing machine having a drive shaft, forwardly or reversely rotatable to record items as positive or as negative amounts respectively, and a shiftable two-color printing ribbon carrier; means operable by said shaft in the reversal thereof to shift said ribbon carrier.

3. In a calculating and listing machine having a drive shaft forwardly or reversely rotatable to record items as positive or as negative amounts respectively, and settable means for visually distinguishing the sign character of the record; means operable by said shaft in the reversal thereof to set the distinguishing means correspondingly.

4. In a calculating machine having registering mechanism and numeral bearing members adapted to be set to represent amounts added to or subtracted from the registered; setting mechanism including two severally adjustable members, and a coordinating lever adapted to transmit opposite movements of different extent to the related numeral bearing member upon adjustment of one or the other adjustable member respectively, and to transmit a movement representing the difference of said opposite movements upon concomitant adjustment of both said members.

Signed at Orange, in the county of Essex and State of New Jersey, this 13th day of December, A. D. 1929.

GEORGE C. CHASE.
LEE R. BROWN.

CERTIFICATE OF CORRECTION.

Patent No. 1,857,356.   May 10, 1932.

GEORGE C. CHASE ET AL.

It is hereby certified that error appears in the printed specification of the above numbered patent requiring correction as follows: Page 2, line 68, for "40" read 400; page 3, line 129, claim 4, after the word "the" insert the word amount; and that the said Letters Patent should be read with these corrections therein that the same may conform to the record of the case in the Patent Office.

Signed and sealed this 12th day of July, A. D. 1932.

(Seal)

M. J. Moore,
Acting Commissioner of Patents.